US011867368B1

(12) United States Patent
Ren

(10) Patent No.: US 11,867,368 B1
(45) Date of Patent: Jan. 9, 2024

(54) TWO-WIRE NON-POLAR MULTIFUNCTIONAL FILAMENT AND LIGHT STRING

(71) Applicant: JIANGMEN CITY SHENGDA LIGHTING CO., LTD., Jiangmen (CN)

(72) Inventor: Juhui Ren, Dongguan (CN)

(73) Assignee: JIANGMEN CITY SHENGDA LIGHTING CO., LTD., Jiangmen (CN)

( * ) Notice: Subject to any disclaimer, the term of this patent is extended or adjusted under 35 U.S.C. 154(b) by 0 days.

(21) Appl. No.: 18/328,784

(22) Filed: Jun. 5, 2023

(30) Foreign Application Priority Data

Mar. 7, 2023 (CN) ........................... 20232041261.1

(51) Int. Cl.

*F21S 4/10* (2016.01)
*F21K 9/237* (2016.01)
*F21V 23/00* (2015.01)
*F21V 23/06* (2006.01)
*F21Y 103/10* (2016.01)
*F21Y 115/10* (2016.01)

(52) U.S. Cl.

CPC ................ *F21S 4/10* (2016.01); *F21K 9/237* (2016.08); *F21V 23/005* (2013.01); *F21V 23/06* (2013.01); *F21Y 2103/10* (2016.08); *F21Y 2115/10* (2016.08)

(58) Field of Classification Search

CPC .......... F21S 4/10; F21K 9/237; F21V 23/005; F21V 23/06; F21Y 2103/10; F21Y 2115/10

See application file for complete search history.

(56) References Cited

U.S. PATENT DOCUMENTS

| | | | | |
|---|---|---|---|---|
| 10,147,850 | B1 * | 12/2018 | Krames | H01L 33/56 |
| 2010/0225215 | A1 * | 9/2010 | Lee | F21K 9/00 313/1 |
| 2017/0321849 | A1 * | 11/2017 | Xiong | H05B 45/345 |
| 2019/0128482 | A1 * | 5/2019 | Jiang | H05B 45/345 |
| 2020/0041113 | A1 * | 2/2020 | Chang | F21V 23/023 |
| 2020/0318821 | A1 * | 10/2020 | Wang | F21K 9/238 |

* cited by examiner

*Primary Examiner* — Evan P Dzierzynski

(57) ABSTRACT

A two-wire non-polar multifunctional filament and a light string are provided. The two-wire non-polar multifunctional filament includes a transparent substrate, a first conductive terminal, and a second conductive terminal. The first conductive terminal and the second conductive terminal are disposed at an end portion of the transparent substrate. At least two layers of wires are disposed in the transparent substrate, and the at least two layers of wires include a first circuit layer and a second circuit layer. The first circuit layer includes a one-way conduction diode, a single-chip microcomputer control chip, and a plurality of first LED light-emitting chip units, and the second circuit layer includes a plurality of second LED light-emitting chips. The light string may switch a lighting function and a light changing function through changing positive and negative electrodes of electric current, which has a better visual effect and is low in product cost.

8 Claims, 7 Drawing Sheets

TWO-WIRE NON-POLAR MULTIFUNCTIONAL FILAMENT AND LIGHT STRING

TECHNICAL FIELD

The present disclosure relates to a technical field of LED bulbs, and in particular to a two-wire non-polar multifunctional filament and a light string.

BACKGROUND

After developing for years, LED light strings gradually become a mainstream of the market, which are not only required for a simple lighting effect, but are preferably able to add more function on a basis of lighting, such as color changes, dynamic flickering of running water, dynamic transformation, etc., so as to improve a visual experience. Since a main cost of the LED light string is light string wires, compared with multi-wire products, a product in a two-wire channel structure still has great advantages, on a basis of not increasing a production cost, it is very necessary to develop a two-line multifunctional light string.

SUMMARY

In view of above disadvantages and deficiencies of the prior art, the present disclosure aims to a two-wire non-polar multifunctional filament and a light string to solve a technical problem that current functional LED light strings have relatively high production cost.

In order to achieve above aims, the present disclosure mainly provides following technical solutions.

In a first aspect, the present disclosure provides a two-wire non-polar multifunctional filament, including a transparent substrate, a first conductive terminal, and a second conductive terminal. The first conductive terminal and the second conductive terminal are disposed at an end portion of the transparent substrate. At least two layers of wires are disposed in the transparent substrate, and the at least two layers of wires include a first circuit layer and a second circuit layer. The first circuit layer includes a one-way conduction diode, a single-chip microcomputer control chip, and a plurality of first LED light-emitting chip units, and the second circuit layer includes a plurality of second LED light-emitting chips. When the first conductive terminal is a positive electrode and the second conductive terminal is a negative electrode, the plurality of the second LED light-emitting chips keep lighting up, and the plurality of the first LED light-emitting chip units and the single-chip microcomputer control chip do not work; or, when the first conductive terminal is a negative electrode and the second conductive terminal is a positive electrode, the plurality of the second LED light-emitting chips do not work, and the plurality of the first LED light-emitting chip units implement various light changes through the single-chip microcomputer control chip.

Furthermore, the first conductive terminal and the second conductive terminal are disposed at a same end of the transparent substrate; or, the first conductive terminal and the second conductive terminal are respectively disposed at two ends of the transparent substrate.

Furthermore, the plurality of the first LED light-emitting chip units are disposed in parallel or in series, and the second LED light-emitting chip units are disposed in series or in parallel. The plurality of the first LED light-emitting chip units and the plurality of the second LED light emitting chips are alternately disposed along a length direction of the transparent substrate, and a packaging adhesive is packaged on a periphery of the two-wire non-polar multifunctional filament.

Furthermore, the plurality of the first LED light-emitting chip units include a red light chip, a green light chip, and a blue light chip.

Furthermore, the one-way conduction diode is a light-emitting diode or a non-lighting diode.

Furthermore, the transparent substrate is made materials of glass, sapphire, ceramic, bismaleimide triazine (BT) resin, or FR4 epoxy.

In a second aspect, the present disclosure further provides a light string, including a plurality of bulbs. The plurality of the bulbs are electrically connected through a string having a two-wire channel structure. Each of the plurality of the bulbs includes a lamp housing, a lamp holder, a supporting core column, and the foregoing two-wire non-polar multifunctional filament. The supporting core column is fixedly assembled in an opening of the lamp housing, the lamp housing is assembled with the lamp holder, the two-wire non-polar multifunctional filament is disposed in the lamp housing, and the two-wire non-polar multifunctional filament is fixed with the supporting core column.

Furthermore, when the first conductive terminal and the second conductive terminal are disposed at a same end of the transparent substrate, the two-wire non-polar multifunctional filament is inserted and matched with the supporting core column.

Beneficial effects of the present disclosure are as following.

First, the present disclosure provides the two-wire non-polar multifunctional filament and the lamp string. Since the at least two layers of wires are disposed in the transparent substrate, the at least two layers of wires include the first circuit layer and the second circuit layer, the first circuit layer includes the one-way conduction diode, the single-chip microcomputer control chip, and the plurality of the first LED light-emitting chip units, and the second circuit layer includes the plurality of the second LED light-emitting chips. Therefore, when the first conductive terminal is the positive electrode and the second conductive terminal is the negative electrode, the plurality of the second LED light-emitting chips keep lighting up, and the plurality of the first LED light-emitting chip units and the single-chip microcomputer control chip do not work due to a one-way conduction effect of the one-way conduction diode; conversely, the plurality of the second LED light-emitting chips are reversed and are not conductive, so that the plurality of the second LED light-emitting chips do not work, and the plurality of the first LED light-emitting chip units implement various light changes and dynamic transformation through the single-chip microcomputer control chip. Moreover, the plurality of the bulbs each assembled with the two-wire non-polar multifunctional filament are electrically connected to form the light string. The light string may switch a lighting function and a light changing function through changing positive and negative electrodes of electric current, which has a better visual effect and is low in product cost, thereby solving a technical problem of high production cost of current functional LED light strings.

Second, the two-wire non-polar multifunctional filament and the light string may achieve switching between the lighting function and the light changing function through changing the positive and negative electrodes of the electric current, which is more convenient and faster in use.

Third, the plurality of the first LED light-emitting chips and the plurality of the second LED light-emitting chips may be selected to be in parallel or in series according to actual needs, which is flexible and changeable, and has wider applicability.

Figure 1:
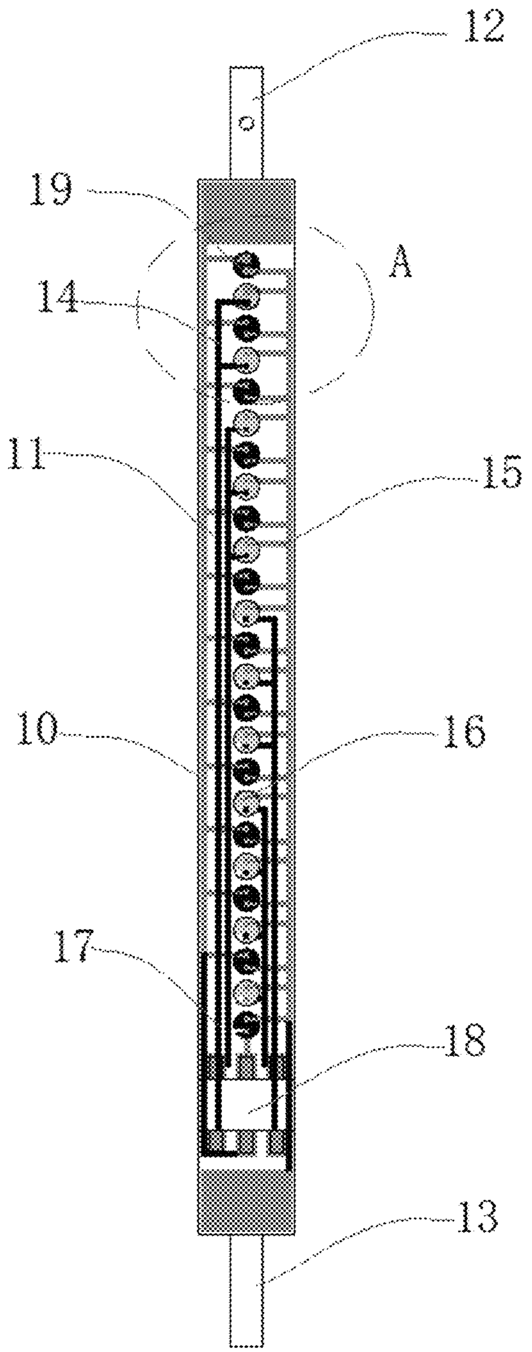
FIG. 1 is a structural schematic diagram of a two-wire non-polar multifunctional filament according to a first embodiment of a two-wire non-polar multifunctional filament and a light string of the present disclosure.

Reference numerals in the drawings: 1. two-wire non-polar multifunctional filament; 10. packaging adhesive; 11. transparent substrate; 12. first conductive terminal; 13. second conductive terminal; 14. first circuit layer; 141. first pad; 15. second circuit layer; 153. third pad; 16. first LED light-emitting chip units; 17. one-way conduction diode; 18. single-chip microcomputer control chip; 19. second LED light-emitting chips; 2. supporting core column; 3. fixing wire; 4. lamp housing; 5. lamp holder; 100. bulb; 200. string.

DETAILED DESCRIPTION

In order to better explain the present disclosure for understanding, the present disclosure is described in detail below with reference to accompanying drawings.

The present disclosure provides a two-wire non-polar multifunctional filament, including a transparent substrate, a first conductive terminal, and a second conductive terminal. The first conductive terminal and the second conductive terminal are disposed at an end portion of the transparent substrate. At least two layers of wires are disposed in the transparent substrate, and the at least two layers of wires include a first circuit layer and a second circuit layer. The first circuit layer includes a one-way conduction diode, a single-chip microcomputer control chip, and a plurality of first LED light-emitting chip units, and the second circuit layer includes a plurality of second LED light-emitting chips. When the first conductive terminal is a positive electrode and the second conductive terminal is a negative electrode, the plurality of the second LED light-emitting chips keep lighting up, and the plurality of the first LED light-emitting chip units and the single-chip microcomputer control chip do not work; or, when the first conductive terminal is a negative electrode and the second conductive terminal is a positive electrode, the plurality of the second LED light-emitting chips do not work, and the plurality of the first LED light-emitting chip units implement various light changes through the single-chip microcomputer control chip. Moreover, the plurality of the bulbs each assembled with the two-wire non-polar multifunctional filament are electrically connected to form the light string. The light string may switch a lighting function and a light changing function through changing positive and negative electrodes of electric current, which has a better visual effect and is low in product cost, thereby solving a technical problem of high production cost of current functional LED light strings.

In order to better understand above technical solutions, exemplary embodiments of the present disclosure are described in more detail below with reference to the accompanying drawings. Although exemplary embodiments of the present disclosure are shown in the accompanying drawings, it should be understood that the present disclosure may be implemented in various forms and should not be limited by the embodiments set forth herein. Rather, these embodiments are provided in order to be able to understand the present disclosure more clearly and thoroughly, and to fully convey the scope of the present disclosure to those who skilled in the art.

First Embodiment

As shown in FIG. 1, the first embodiment of the present disclosure provides a two-wire non-polar multifunctional filament, including a transparent substrate 11 having a printed circuit, a first conductive terminal 12, and a second conductive terminal 13. The first conductive terminal 12 and the second conductive terminal 13 are respectively disposed at two ends of the transparent substrate 11. A packaging adhesive 10 containing astigmatism powder is packaged on a periphery of the two-wire non-polar multifunctional filament 1, so that the two-wire non-polar multifunctional filament 1 uniformly lights up.

Specifically, the transparent substrate 11 is made materials of glass, sapphire, ceramic, bismaleimide triazine (BT) resin, or FR4 epoxy. At least two layers of wires are disposed in the transparent substrate 11, and the at least two layers of wires include a first circuit layer 14 and a second circuit layer 15. The first circuit layer 14 includes a one-way conduction diode 17, a single-chip microcomputer control chip 18, and a plurality of first LED light-emitting chip units 16, and the plurality of the first LED light-emitting chip units 16 include a red light chip, a green light chip, and a blue light chip. The second circuit layer 15 includes a plurality of second LED light-emitting chips 19, and light-emitting colors of the plurality of the second LED light-emitting chips 19 are not limited, and may be a red light chip, a green light chip, or a blue light chip. In an actual application process, the plurality of the first light-emitting chip units 16 may be selected to be disposed in parallel or in series, the plurality of the second light-emitting chips 19 are disposed in parallel or in series, and the plurality of the first LED light-emitting chip units 16 and the plurality of the second LED light emitting chips 19 are alternately disposed along a length direction of the transparent substrate 11.

Figure 1A:
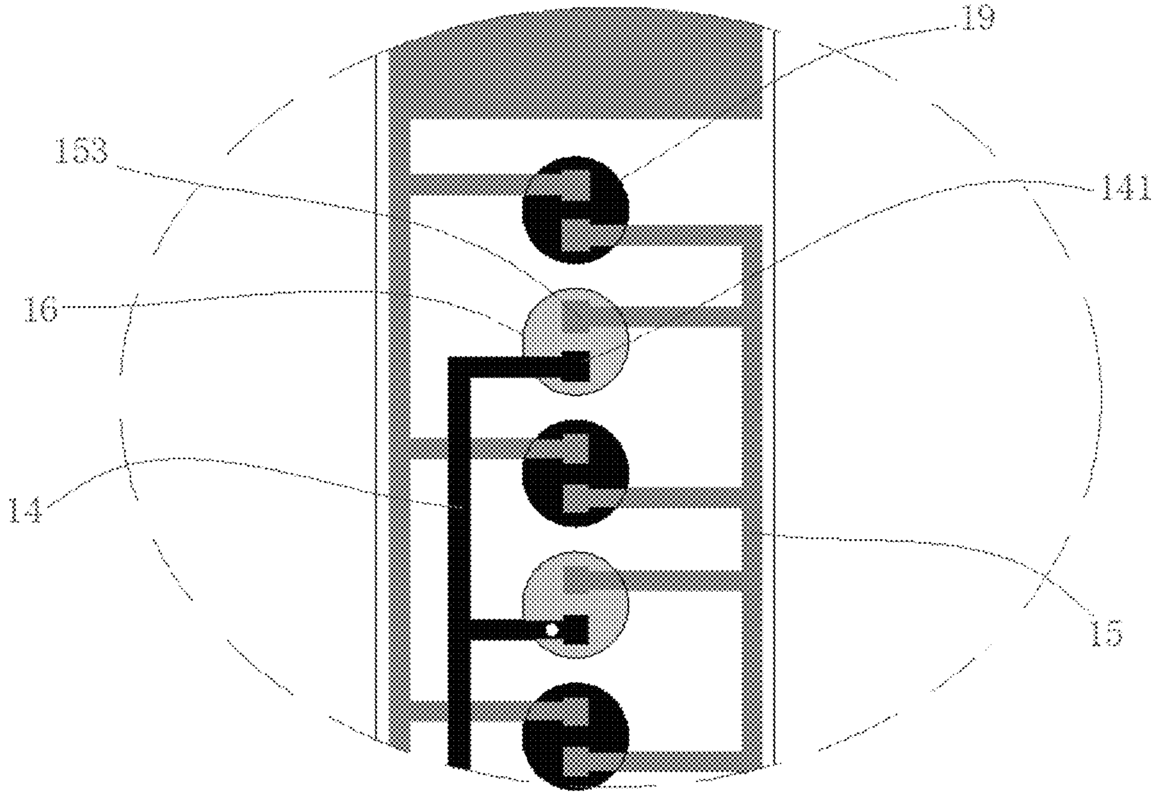
FIG. 1A is a schematic diagram of an enlarged view of portion A shown in FIG. 1.

As shown in FIG. 1A, the first circuit layer 14 includes a plurality of first pads 141, the second circuit layer 15 includes a plurality of second pads and a plurality of third pads 153. The plurality of the first pads 141 and the plurality of the third pads 152 are consistent in number, and one of the plurality of the first pads 141 and one of the plurality of the third pads 153 form a first solder joint for soldering with positive and negative pins of the plurality of the first LED light-emitting chip units 16. A second solder joint includes two pads for soldering with positive and negative pins of the plurality of the second LED light-emitting chips 19. The positive and negative pins of the plurality of the first LED light-emitting chip units 16 and the positive and negative pins of the plurality of the second LED light-emitting chips 19 are opposite in soldering directions.

The one-way conduction diode 17 has a one-way conduction function, so that the first circuit layer 14 is in one-way conduction. In an actual production process, the one-way conduction diode 17 may be a light-emitting diode or a non-lighting diode. The single-chip microcomputer control chip 48 includes a control program to control light emission of each of the plurality of the first LED light-emitting chip units 16 of the first circuit layer 14, so as to implement various light changes and dynamic transformation.

Figure 5:
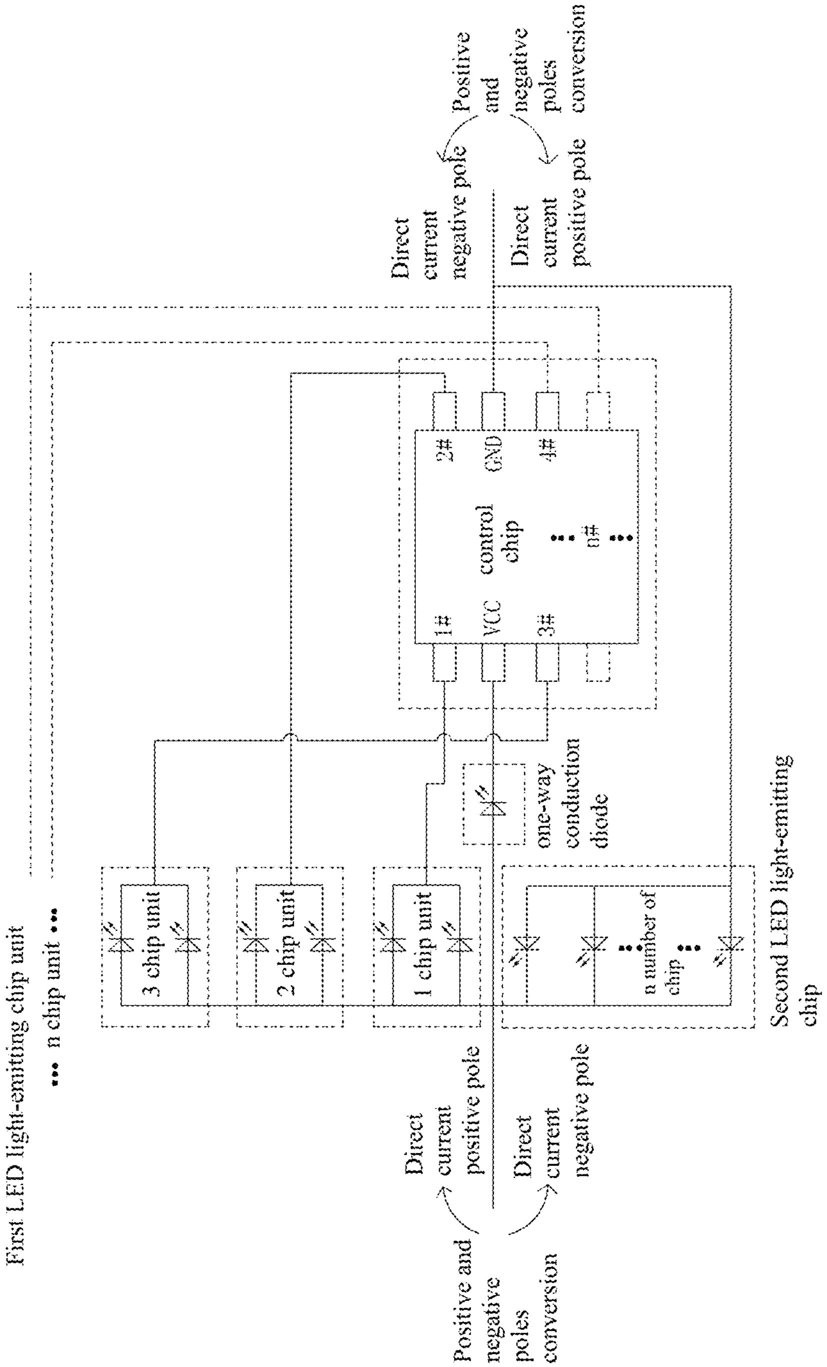
FIG. 5 is a schematic diagram of a working principle of the two-wire non-polar multifunctional filament.

As shown in FIG. 5, when the first conductive terminal 12 is the positive electrode and the second conductive terminal 13 is the negative electrode, the plurality of the second LED light-emitting chips 19 keep lighting up, and since the one-way conduction diode is in one-way conduction, the first circuit layer 14 is not energized, the plurality of the first LED light-emitting chip units 16 and the single-chip microcomputer control chip 18 do not work, at this time, the two-wire non-polar multifunctional filament 1 only implements a lighting function.

Conversely, when the first conductive terminal 12 is the negative electrode and the second conductive terminal 13 is the positive electrode, since the plurality of the second LED light-emitting chips 19 are reversed and are not conductive, the plurality of the second LED light-emitting chips 19 do not work, and the plurality of the first LED light-emitting chip units implement various light changes and dynamic transformation, such as water flowing, horse running, flickering, etc., through the single-chip microcomputer control chip 18 having own control program. At this time, the two-wire non-polar multifunctional filament 1 implements a light changing function.

Second Embodiment

Figure 2:
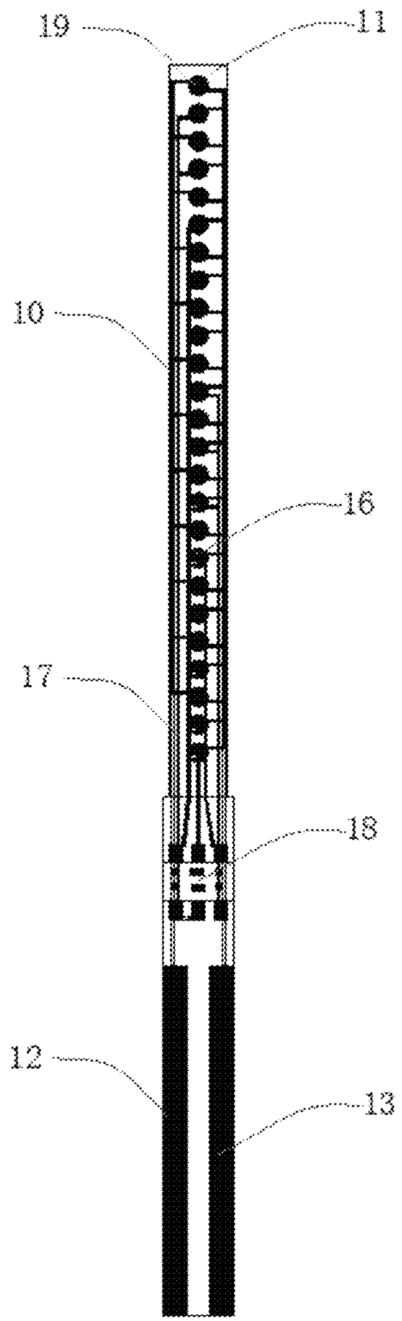
FIG. 2 is a structural schematic diagram of the two-wire non-polar multifunctional filament according to a second embodiment of the two-wire non-polar multifunctional filament and the light string of the present disclosure.

As shown in FIG. 2, different from the first embodiment, the first conductive terminal 12 and the second conductive terminal 13 of the two-wire non-polar multifunctional filament 1 in the second embodiment are disposed at the same end of the transparent substrate 11.

Third Embodiment

Figure 3:
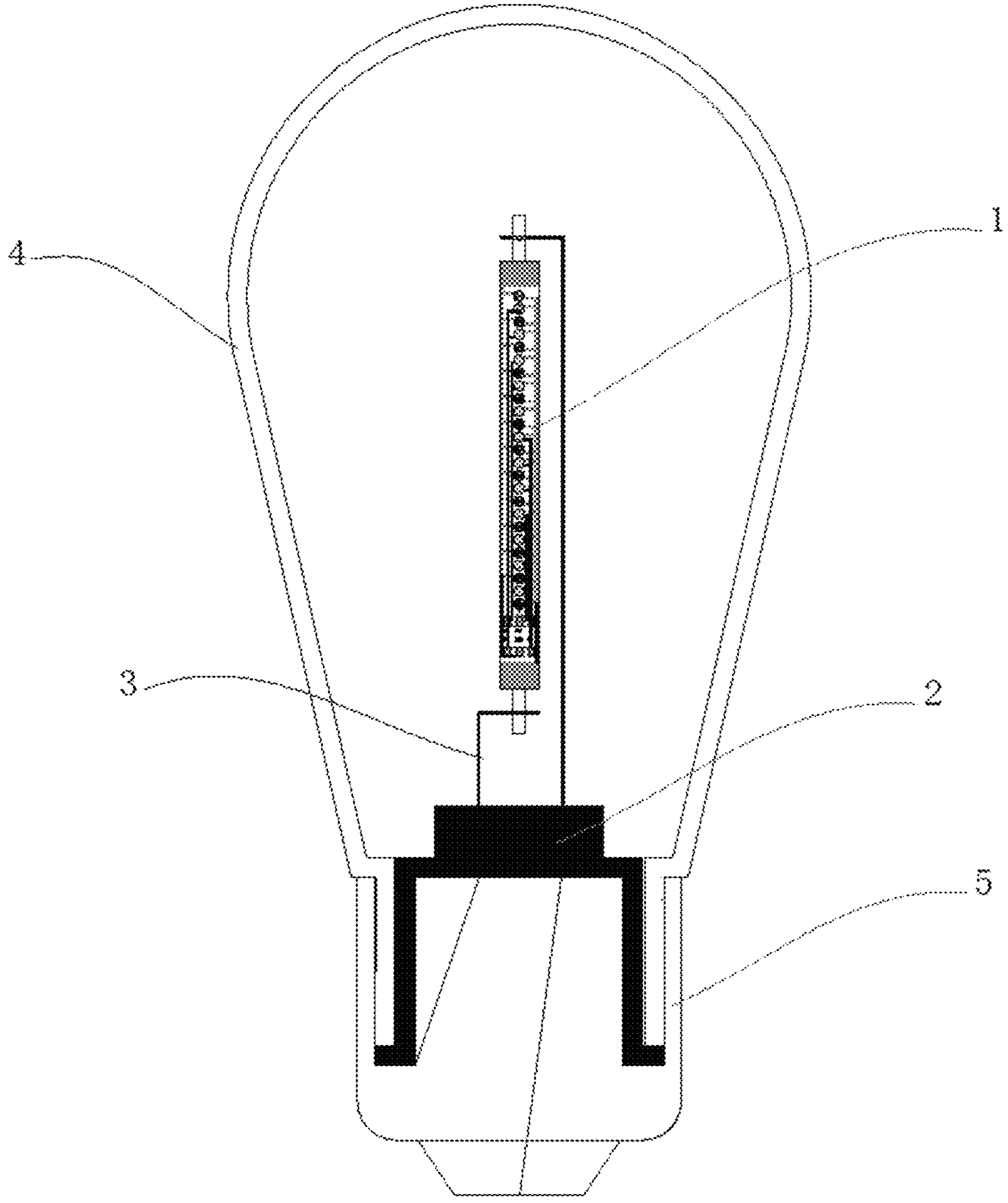
FIG. 3 is an assembly schematic diagram of the two-wire non-polar multifunctional filament according to a third embodiment of the two-wire non-polar multifunctional filament and the light string of the present disclosure.

As shown in FIG. 3, on a basis of the first embodiment, the third embodiment provides a bulb 100 in a spot-welding type, and the bulb 100 includes a lamp housing 4, a lamp holder 5, a supporting core column 2, and the two-wire non-polar multifunctional filament 1.

The supporting core column 2 is fixedly assembled in an opening of the lamp housing 4, the lamp housing 4 is assembled with the lamp holder 5, the first conductive terminal 12 and the second conductive terminal 13 of the two-wire non-polar multifunctional filament 1 are respectively spot welded with a first end of a corresponding one of fixing wires 3, and a second end of each of the fixing wires 3 penetrates through the supporting core column 2, so as to fixedly assemble the two-wire non-polar multifunctional filament 1 in the lamp housing 4.

Fourth Embodiment

Figure 4:
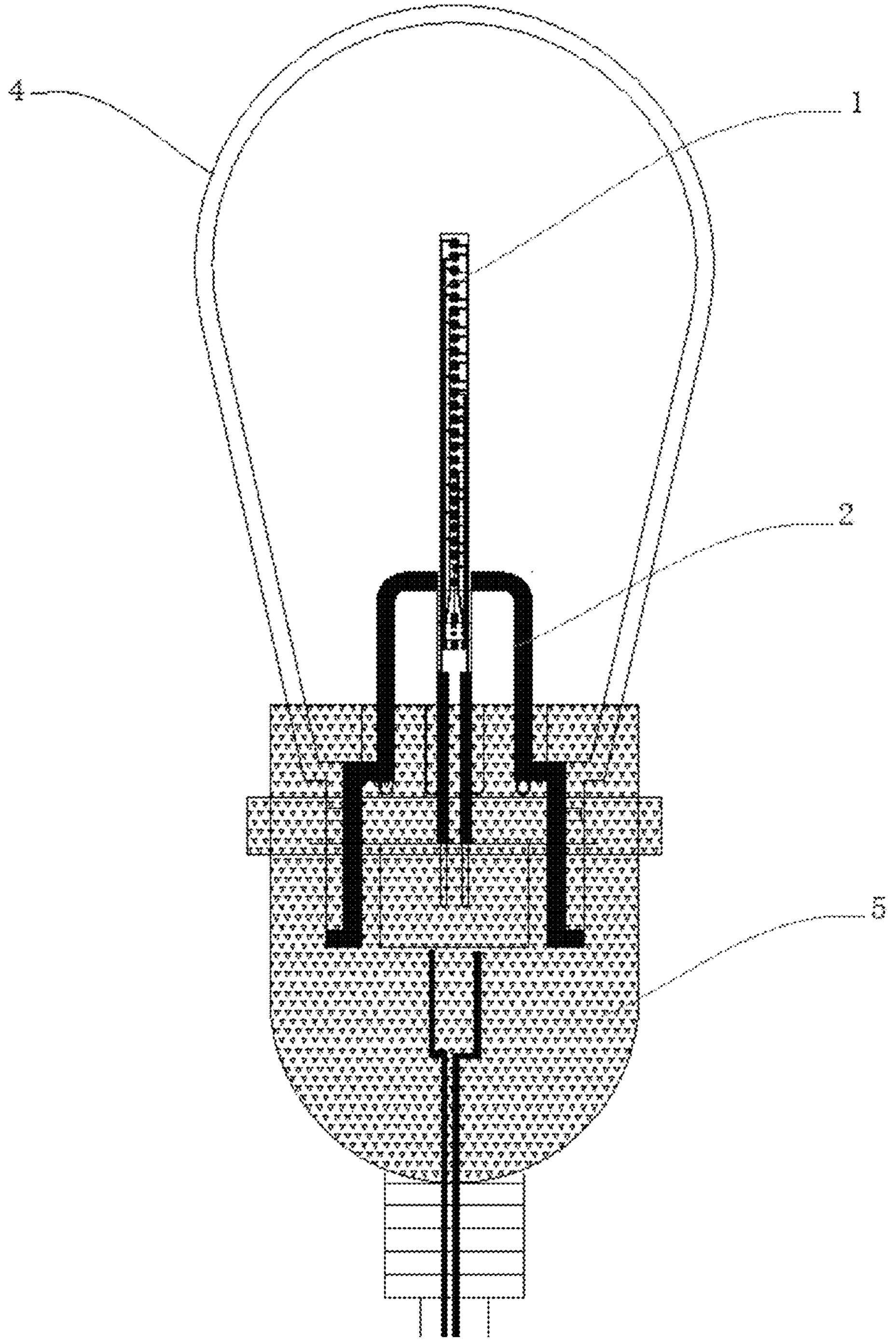
FIG. 4 is an assembly schematic diagram of the two-wire non-polar multifunctional filament according to a fourth embodiment of the two-wire non-polar multifunctional filament and the light string of the present disclosure.

As shown in FIG. 4, on a basis of the second embodiment, the fourth embodiment provides a bulb 100 in a direct-embedded type, and the bulb 100 includes a lamp housing 4, a lamp holder 5, a supporting core column 2, and the two-wire non-polar multifunctional filament 1.

The supporting core column 2 is fixedly assembled in an opening of the lamp housing 4, the lamp housing 4 is assembled with the lamp holder 5, the first conductive terminal 12 and the second conductive terminal 13 of the two-wire non-polar multifunctional filament 1 are respectively are inserted and matched with the supporting core column 2, so as to fixedly assemble the two-wire non-polar multifunctional filament 1 in the lamp housing 4, which is convenient for assembly.

Fifth Embodiment

Figure 6:
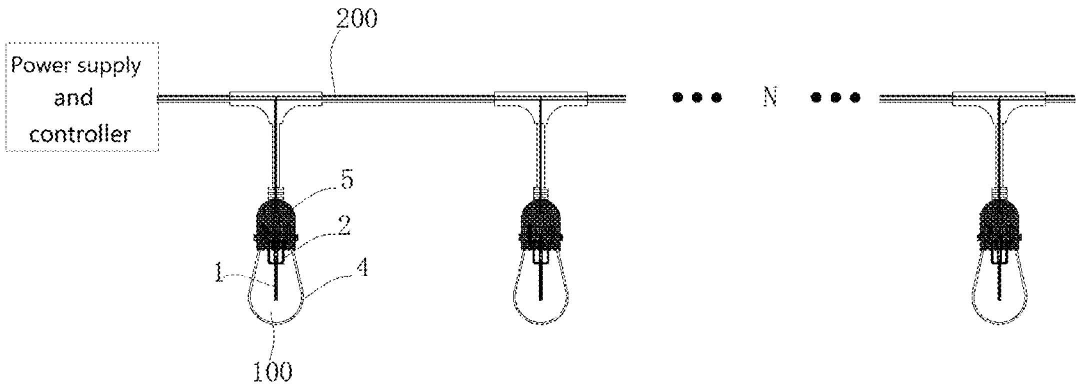
FIG. 6 is a schematic diagram of a light string according to a fifth embodiment of the two-wire non-polar multifunctional filament and the light string of the present disclosure.

As shown in FIG. 6, the fifth embodiment provides a light string, including

Please refer to FIGS. 1-5, the present disclosure provides a two-wire non-polar multifunctional filament and light string 100, including a plurality of bulbs 100 being disposed in parallel or in series. The plurality of the bulbs 100 are electrically connected through a string 200 having a two-wire channel structure. Two wires of the string 200 are electrically connected to the first conductive terminal 12 and the second conductive terminal 13. Specifically, the plurality of bulbs 100 may be selected from the bulb 100 in the spot-welding type of the third embodiment or the bulb 100 in the direct-embedded type of the fourth embodiment.

The light string 100 is provided with the string 200 having the two-wire channel structure, and the transparent substrate 11 of the light string 1 includes the two layers of the wires, and the first circuit layer 14 includes the single-chip microcomputer control chip 18 and the one-way conduction diode 17. The light string 100 may switch a lighting function and a light changing function through changing positive and negative electrodes of electric current, so as to adapt to different usage scenarios, which has high practicability, is convenient in operation, has a better visual effect, and is low in product cost, thereby solving a technical problem of high production cost of current functional LED light strings.

In the description of the present disclosure, it should be understood that the terms “first” and “second” are used for descriptive purposes only and cannot be understood as indicating or implying relative importance or implicitly indicating the number of indicated technical features. Thus, the features defined with “first” and “second” may explicitly or implicitly include one or more of the features. In the description of the present disclosure, the meaning of “a plurality of” is two or more, unless specifically defined otherwise.

In the present disclosure, terms such as “disposed”, “connected with”, “connected to”, “fixed”, etc. should be construed broadly unless expressly specified and defined otherwise, for example, may be a fixed connection, a detachable connection, or a whole; may be a mechanical connection or an electrical connection; may be a direct connection or an indirect connection via an intermediate medium; may be a communication relationship between two elements or an interaction relationship between two elements. For those who skilled in the art, the specific meaning of the above terms in the present disclosure may be understood according to specific situations.

In the present disclosure, unless expressly specified and defined otherwise, features of the first feature being “on” or “under” the second feature may be a direct contact between the first feature and the second feature, or the first feature and the second feature are indirectly in contact with each other by means of an intermediate medium. Moreover, the first feature being “above”, “on an upper portion of”, and “on an upper surface of” the second feature may be that the first feature is directly above or obliquely above the second feature, or merely indicates that a horizontal height of the first feature is higher than a horizontal height of the second feature. The first feature is “below”, “at a lower portion of”, and “at a lower surface” of the second feature, and may be that the first feature is directly below or obliquely below the second feature, or merely indicates that a horizontal height of the first feature is lower than a horizontal height of the second feature.

In the description of the present specification, the terms “one embodiment”, “some embodiments”, “an embodiment”, “an example”, “a specific example”, or “some examples” refer to specific features, structures, materials, or characteristics described in connection with the embodiments or examples in at least one embodiment or example of the present disclosure. In this specification, the schematic representation of the above terms does not necessarily refer to the same embodiment or example. Furthermore, the particular features, structures, materials, or characteristics described may be combined in any suitable manner in any one or more embodiments or examples. In addition, in the case of no contradiction, those who skilled in the art may combine and combine different embodiments or examples described in this specification and features of different embodiments or examples.

Although the embodiments of the present disclosure have been shown and described above, it may be understood that the foregoing embodiments are exemplary and cannot be understood as limitations to the present disclosure, and those skilled in the art may make revisions, modifications, substitutions, and variations to the foregoing embodiments within the scope of the present disclosure.

What is claimed is:

1. A two-wire non-polar multifunctional filament, comprising:

a transparent substrate;

a first conductive terminal;

a second conductive terminal;

wherein the first conductive terminal and the second conductive terminal are disposed at an end portion of the transparent substrate; at least two layers of wires are disposed in the transparent substrate, and the at least two layers of wires comprise a first circuit layer and a second circuit layer; the first circuit layer comprises a one-way conduction diode, a single-chip microcomputer control chip, and a plurality of first LED light-emitting chip units, and the second circuit layer comprises a plurality of second LED light-emitting chips;

when the first conductive terminal is a positive electrode and the second conductive terminal is a negative electrode, the plurality of the second LED light-emitting chips keep lighting up, and the plurality of the first LED light-emitting chip units and the single-chip microcomputer control chip do not work; or, when the first conductive terminal is a negative electrode and the second conductive terminal is a positive electrode, the plurality of the second LED light-emitting chips do not work, and the plurality of the first LED light-emitting chip units implement various light changes through the single-chip microcomputer control chip.

2. The two-wire non-polar multifunctional filament according to claim 1, wherein the first conductive terminal and the second conductive terminal are disposed at a same end of the transparent substrate; or, the first conductive terminal and the second conductive terminal are respectively disposed at two ends of the transparent substrate.

3. The two-wire non-polar multifunctional filament according to claim 2, wherein the plurality of the first LED light-emitting chip units are disposed in parallel or in series, and the second LED light-emitting chip units are disposed in series or in parallel; the plurality of the first LED light-emitting chip units and the plurality of the second LED light emitting chips are alternately disposed along a length direction of the transparent substrate, and a packaging adhesive is packaged on a periphery of the two-wire non-polar multifunctional filament.

4. The two-wire non-polar multifunctional filament according to claim 1, wherein the plurality of the first LED light-emitting chip units comprise a red light chip, a green light chip, and a blue light chip.

5. The two-wire non-polar multifunctional filament according to claim 1, wherein the one-way conduction diode is a light-emitting diode or a non-lighting diode.

6. The two-wire non-polar multifunctional filament according to claim 1, wherein the transparent substrate is made materials of glass, sapphire, ceramic, bismaleimide triazine (BT) resin, or FR4 epoxy.

7. A light string, comprising:

a plurality of bulbs;

wherein the plurality of the bulbs are electrically connected through a string having a two-wire channel structure; each of the plurality of the bulbs comprises a lamp housing, a lamp holder, a supporting core column, and the two-wire non-polar multifunctional filament according to claim 1;

the supporting core column is fixedly assembled in an opening of the lamp housing, the lamp housing is assembled with the lamp holder, the two-wire non-polar multifunctional filament is disposed in the lamp housing, and the two-wire non-polar multifunctional filament is fixed with the supporting core column.

8. The light string according to claim 7, wherein when the first conductive terminal and the second conductive terminal are disposed at a same end of the transparent substrate, the two-wire non-polar multifunctional filament is inserted and matched with the supporting core column.

* * * * *